United States Patent
Lee et al.

(10) Patent No.: US 11,184,052 B2
(45) Date of Patent: Nov. 23, 2021

(54) APPARATUS AND METHOD WITH NEAR-FIELD COMMUNICATION

(71) Applicant: Samsung Electronics Co., Ltd., Suwon-si (KR)

(72) Inventors: Wonseok Lee, Yongin-si (KR); Seok Ju Yun, Hwaseong-si (KR); Sang Joon Kim, Hwaseong-si (KR); Jaechun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 16/431,835

(22) Filed: Jun. 5, 2019

(65) Prior Publication Data
US 2020/0212961 A1  Jul. 2, 2020

(30) Foreign Application Priority Data
Dec. 28, 2018 (KR) .......................... 10-2018-0172665

(51) Int. Cl.
*H04B 7/00* (2006.01)
*H04B 5/00* (2006.01)

(52) U.S. Cl.
CPC ................................. *H04B 5/0025* (2013.01)

(58) Field of Classification Search
CPC .................................................. H04B 5/0025
USPC ...................................................... 455/41.1
See application file for complete search history.

(56) References Cited

U.S. PATENT DOCUMENTS

| 9,878,167 | B1 * | 1/2018 | He | A61N 1/37288 |
| 2009/0203315 | A1 * | 8/2009 | Kawabata | H03F 3/45179 |
| | | | | 455/41.1 |
| 2012/0231732 | A1 * | 9/2012 | Kerselaers | H04B 5/0006 |
| | | | | 455/41.1 |
| 2013/0078914 | A1 * | 3/2013 | Royston | H04B 5/02 |
| | | | | 455/41.1 |
| 2013/0109305 | A1 * | 5/2013 | Savoj | G06K 19/07749 |
| | | | | 455/41.1 |
| 2013/0109309 | A1 * | 5/2013 | Desclos | H04B 5/0075 |
| | | | | 455/41.1 |
| 2013/0198463 | A1 * | 8/2013 | Hintz | A61N 1/3787 |
| | | | | 711/154 |
| 2013/0343585 | A1 * | 12/2013 | Bennett | H04R 25/554 |
| | | | | 381/315 |

(Continued)

FOREIGN PATENT DOCUMENTS

CN 105262513 A 1/2016
JP 2013-229916 A 11/2013

(Continued)

*Primary Examiner* — April G Gonzales
(74) *Attorney, Agent, or Firm* — NSIP Law (57) ABSTRACT

Disclosed is a near-field communication (NFC) system that includes an NFC supporting apparatus. The NFC supporting apparatus includes a dual coil and a first switch. The dual coil includes an NFC band coil and a radio frequency (RF) band coil. An RF amplitude modulation signal is generated at the RF band coil in response to a transmission from an implantable device. The first switch is configured to switch the NFC band coil based on the RF amplitude modulation signal. The NFC band coil is configured to generate an NFC amplitude modulation signal at an NFC band coil of an NFC reader in response to the first switch.

13 Claims, 8 Drawing Sheets

(56) References Cited

U.S. PATENT DOCUMENTS

| | | | |
|---|---|---|---|
| 2015/0223057 A1* | 8/2015 | Dellarciprete | G16H 10/60 |
| | | | 455/410 |
| 2015/0351648 A1* | 12/2015 | Harvey | A61B 5/076 |
| | | | 600/561 |
| 2016/0142106 A1* | 5/2016 | Pernisek | H04B 13/005 |
| | | | 455/41.1 |
| 2017/0020402 A1* | 1/2017 | Rogers | A61B 5/02055 |
| 2017/0363673 A1* | 12/2017 | Mukherjee | G01D 5/206 |
| 2018/0001090 A1* | 1/2018 | Wissenwasser | A61N 1/37223 |
| 2018/0110018 A1* | 4/2018 | Yu | H04B 5/0031 |
| 2018/0138596 A1* | 5/2018 | Lee | H01F 38/14 |
| 2018/0287243 A1* | 10/2018 | Ko | H04B 5/0025 |
| 2018/0301790 A1* | 10/2018 | Kim | H01Q 7/00 |
| 2018/0331726 A1* | 11/2018 | Ha | H04B 5/0081 |

FOREIGN PATENT DOCUMENTS

| | | |
|---|---|---|
| JP | 2015-515209 A | 5/2015 |
| KR | 10-2016-0122615 A | 10/2016 |

* cited by examiner

APPARATUS AND METHOD WITH NEAR-FIELD COMMUNICATION

CROSS-REFERENCE TO RELATED APPLICATIONS

This application claims the benefit under 35 USC § 119(a) of Korean Patent Application No. 10-2018-0172665 filed on Dec. 28, 2018 in the Korean Intellectual Property Office, the entire disclosure of which is incorporated herein by reference for all purposes.

BACKGROUND

1. Field

The following description relates to an apparatus and method with near-field communication.

2. Description of Related Art

Near-field communication (NFC) is a type of open radio frequency identification (RFID) technology, for example, that supports short-range wireless communication. NFC is based on ISO14443 standard for wireless communication that occurs within a short distance, e.g., of 10 cm or less at a frequency of 13.56 MHz. NFC supports data transmission and reception in both directions within a distance of 10 cm or less. For example, NFC may transmit data at a rate ranging from 106 kbps to 848 kbps and does not require a procedure for pairing two terminals, thereby enabling fast transmission.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a near-field communication (NFC) supporting apparatus includes a dual coil and a first switch. The dual coil includes an NFC band coil and a radio frequency (RF) band coil. An RF amplitude modulation signal is generated at the RF band coil in response to an RF band coil of an implantable device. The first switch is configured to switch the NFC band coil based on the RF amplitude modulation signal. The NFC band coil is configured to generate an NFC amplitude modulation signal at an NFC band coil of an NFC reader in response to the first switch.

The NFC supporting apparatus may further include a low-noise amplifier (LNA) and an envelope detector. The LNA is configured to amplify the generated NFC amplitude modulation signal. The envelope detector is configured to extract a switch signal from the amplified NFC amplitude modulation signal, and the first switch is configured to switch the NFC band coil based on the switch signal.

The NFC supporting apparatus may further include a second switch. The second switch is configured to toggle the NFC band coil to an OFF state when an RF amplitude modulation signal is not generated at the RF band coil of the implantable device, and the second switch is configured to toggle the NFC band coil to an ON state when an RF amplitude modulation signal is generated at the RF band coil of the implantable device.

In another general aspect, a near-field communication (NFC) reader includes a processor, a first NFC band coil, a dual coil, and a first switch, the dual coil including a second NFC band coil and a radio frequency (RF) band coil. The processor is configured to transmit a data request signal to an NFC band coil of an implantable device through the first NFC band coil. An RF amplitude modulation signal is generated at the RF band coil of an RF band coil of the implantable device in response to the data request signal. The first switch is configured to switch to the second NFC band coil based on the RF amplitude modulation signal, and the second NFC band coil is configured to generate an NFC amplitude modulation signal at the first NFC band coil in response to the first switch.

The NFC reader may further include a low-noise amplifier (LNA) and an envelope detector. The LNA is configured to amplify the RF amplitude modulation signal generated at the RF band coil. The envelope detector is configured to extract a switch signal from the amplified RF amplitude modulation signal. The first switch is configured to switch to the second NFC band coil based on the switch signal.

The NFC reader may further include a second switch. The second switch is configured to toggle the second NFC band coil to an OFF state when an RF amplitude modulation signal is not generated at the RF band coil of the implantable device. The second switch is configured to toggle the second NFC band coil to an ON state when an RF amplitude modulation signal is generated at the RF band coil of the implantable device.

In another general aspect, a near-field communication (NFC) method includes receiving a first data request signal from an NFC reader, transmitting an NFC data signal of an NFC band to the NFC reader in response to the first data request signal, receiving a second data request signal from the NFC reader, wherein the second data request signal is a duplicate of the first data request signal, and transmitting a radio frequency (RF) data signal of an RF band to an NFC supporting apparatus of an RF band coil in response to the second data request signal.

In another general aspect, a near-field communication (NFC) method includes receiving a radio frequency (RF) data signal of an RF band from an implantable device, extracting a switch signal from the data signal, and switching to an NFC band coil of an NFC supporting apparatus based on the switch signal using a first switch of the NFC supporting apparatus. The NFC band coil is configured to generate an NFC amplitude modulation signal at an NFC band coil of an NFC reader in response to the first switch.

The NFC method may further include changing the NFC band coil of the NFC supporting apparatus to be in an ON state by toggling a second switch of the NFC supporting apparatus, in response to reception of the RF data signal.

In another general aspect, a near-field communication (NFC) supporting apparatus includes an NFC band coil, a radio frequency (RF) antenna, and a first switch. A data signal is transmitted to the RF antenna of an RF band coil of an implantable device. The first switch is configured to switch to the NFC band coil based on the data signal. The NFC band coil is configured to generate an NFC amplitude modulation signal at an NFC band coil of an NFC reader in response to the first switch.

In another general aspect, a near-field communication (NFC) supporting apparatus includes an NFC band coil, a first body-coupled communication (BCC) electrode, and a first switch. The first BCC electrode is configured to receive a data signal from a second BCC electrode of an implantable device. The first switch is configured to switch to the NFC band coil based on the data signal. The NFC band coil is configured to generate an NFC amplitude modulation signal at an NFC band coil of an NFC reader in response to the first switch.

In another general aspect, z near-field communication (NFC) supporting apparatus includes an NFC band coil, a photodetector, and a first switch. The photodetector is configured to receive an optical signal from a light emitting diode (LED) of an implantable device. The first switch is configured to switch to the NFC band coil based on the optical signal. The NFC band coil is configured to generate an NFC amplitude modulation signal at an NFC band coil of an NFC reader in response to the first switch.

Other features and aspects will be apparent from the following detailed description, the drawings, and the claims.

Throughout the drawings and the detailed description, unless otherwise described or provided, the same drawing reference numerals will be understood to refer to the same or similar elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains in view of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Meanwhile, in some alternative implementations, functions or operations specified in predetermined blocks may be performed in an order different from that shown in a flowchart. For example, two successive blocks may be performed substantially concurrently in practice or may be performed in a reverse order depending upon the related functions or operations.

Figure 1:
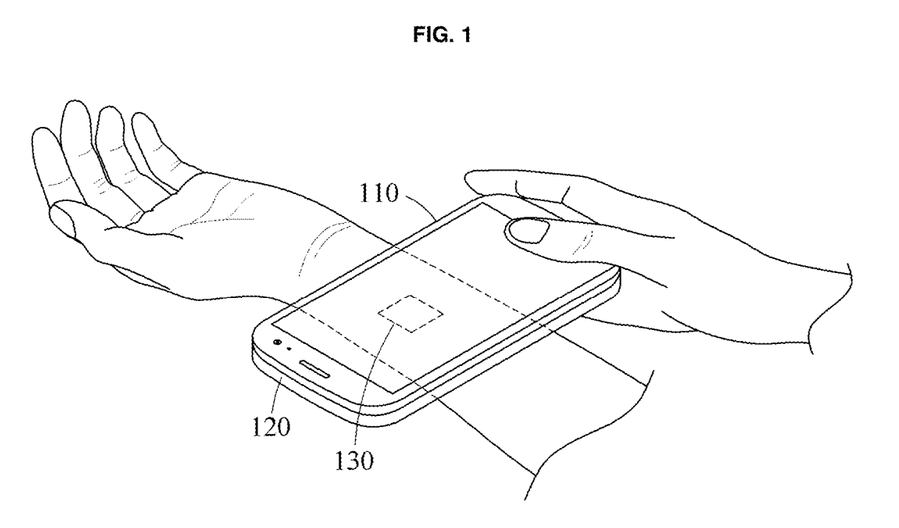
FIG. 1 illustrates an example of communicating with an implantable device using near-field communication (NFC) supporting apparatus.

FIG. 1 illustrates an example of communicating with an implantable device using near-field communication (NFC) supporting apparatus.

Referring to FIG. 1, a user communicates with an implantable device 130 using an NFC reader 110. Depending on a communication circumstance, the communication between the NFC reader 110 and the implantable device 130 may be difficult. An NFC supporting apparatus 120 facilitates the communication between the NFC reader 110 and the implantable device 130.

When the implantable device 130 is implanted into a living body, NFC may even be difficult within a short distance. For example, when the size of an NFC band coil of the implantable device 130 decreases, data transmitted from the implantable device 130 may not be received and/or noisy. The implantable device 130 may help overcome a noisy and/or less than ideal NFC communication environment using a frequency of an RF band of the NFC supporting apparatus 120.

The NFC supporting apparatus 120 may be used for wireless communication between the NFC reader 110 and the implantable device 130. The NFC supporting apparatus 120 may be used to wirelessly communicate with the implantable device 130 implanted within the body of an animal; however, examples are not limited thereto. The NFC supporting apparatus 120 may be used for communicating with a device or implantable device 130 not implanted into an animal. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The communication between the NFC reader 110 and the implantable device 130 is NFC, e.g., according to a standard of, or related to, ISO14443. A carrier frequency of an NFC band is used for the communication between the NFC reader 110 and the implantable device 130. The NFC reader 110 transmits a data request signal of an NFC band to the implantable device 130. In response to the data request signal, the implantable device 130 transmits a data signal to the NFC reader 110. Here, the NFC band may include 13.56 MHz. The data signal may be an amplitude modulation signal transmitted through amplitude modulation.

The amplitude modulation may be amplitude shift keying (ASK), which is a digital modulation scheme of transmitting transmission data by changing the presence or absence of an analog signal. This amplitude modulation operates by changing the intensity of a signal to be transmitted with respect to information to be transmitted. For example, by changing the intensity of a signal to be output, a sound is generated through a speaker or the brightness of a pixel of a television changed.

When NFC is applied to an implantable device, it is possible to perform data and wireless power supply transmission/reception concurrently. However, when the size of a coil of the implantable device decreases and/or the implanted depth increases, the relative distance between an NFC reader and the implantable device increases. The mutual inductance between coils of the NFC reader and the implantable device is $M_{12}=k\sqrt{L_1 L_2}$. Thus, the mutual inductance decreases in proportion to the size of the coil and the distance; thus, making normal amplitude modulation and data reception relatively difficult.

Due to a communication environment issue, such as a noisy environment, the NFC reader 110 may not receive, or adequately receive, the data signal from the implantable device 130. For example, when amplitude modulation of the signal between the NFC reader 110 and the implantable device 130 does not sufficiently occur due to distance or noise between the NFC reader 110 and the implantable device 130, data transmission may become compromised making it more difficult to receive data normally. For example, when the size of the NFC band coil included in the implantable device 130 is overly small, and the implantable device 130 is implanted relatively deep inside a body, or when the NFC reader 110 is disposed at a relatively long distance from the implantable device 130, the NFC reader 110 may receive erroneous or noisy data signal, or no data signal.

In an environment in which normal data reception of the NFC reader 110 is thus compromised when using an amplitude modulation signal of the implantable device 130, the NFC supporting apparatus 120 may transmit an amplitude modulation signal to the NFC reader 110 through another type of data signal transfer. For example, the implantable device 130 may receive a data request signal from the NFC reader 110 through NFC and transmit a reply data signal to the NFC supporting apparatus 120 using a frequency of a medical implant communication system (MICS) band, for example.

The NFC supporting apparatus 120 may relay data transmission between the implantable device 130 and the NFC reader 110. The NFC supporting apparatus 120 may receive an RF band signal from the implantable device 130 and change the impedance of the NFC reader 110 based on the received RF band signal. The NFC reader 110 receives the data signal through impedance change.

The NFC supporting apparatus 120 may decode the data signal received from the implantable device 130. The NFC supporting apparatus 120 may generate an amplitude modulation signal at an NFC band coil of the NFC reader 110 by switching the NFC band coil based on the decoded data. Here, the data signal transmitted by the NFC supporting apparatus 120 may include an ASK ON/OFF signal—the same as a switch signal for load modulation in the general NFC Standard.

The communication between the NFC supporting apparatus 120 and the implantable device 130 may use a frequency signal of a frequency band different from the NFC band. For example, the communication between the NFC supporting apparatus 120 and the implantable device 130 may use a frequency signal of an RF band that includes a MICS band.

In an example, the NFC supporting apparatus 120 includes a resonator including the NFC band coil. The resonator may be configured to resonate at 13.56 MHz. The NFC supporting apparatus 120 may transmit the data signal to the NFC reader 110 using the NFC band coil. The NFC band coil of the NFC supporting apparatus 120 may be disposed close to an NFC band coil to constitute an impedance matching circuit of the NFC reader 110.

The NFC supporting apparatus 120 may switch the NFC band coil to a frequency of the NFC band. In an example, the NFC supporting apparatus 120 connects or disconnects the NFC band coil to and from a circuit through ON/OFF toggling of a switch, e.g., with the NFC supporting apparatus 120 changing, through ON/OFF toggling of a switch connected to the NFC band coil, an impedance of an NFC reception terminal of the NFC reader 110 to be similar to an impedance changed when a data signal of an NFC band is received from the implantable device 130.

The NFC band coil of the NFC supporting apparatus 120 may change the mutual inductance formed as being coupled to the NFC band coil of the NFC reader 110. Load modulation may occur at the NFC band coil of the NFC reader 110. Here, the load modulation may be amplitude modulation, and the NFC reader 110 may receive an amplitude modulation signal. In an example where the amplitude modulation signal includes data, the amplitude modulation signal is a data signal. The NFC reader 110 may recognize data by demodulating the changed impedance in a manner commonly associated with the general NFC standard. An NFC module chip of the NFC reader 110 may extract the data from the amplitude modulation signal.

As described above, the NFC supporting apparatus 120 may provide for microminiaturization and ultra-low power consumption in the implantable device and support resilient data communication to enable uncompromised data reception while utilizing a generic commercial NFC reader, such as a smartphone.

Figure 2:
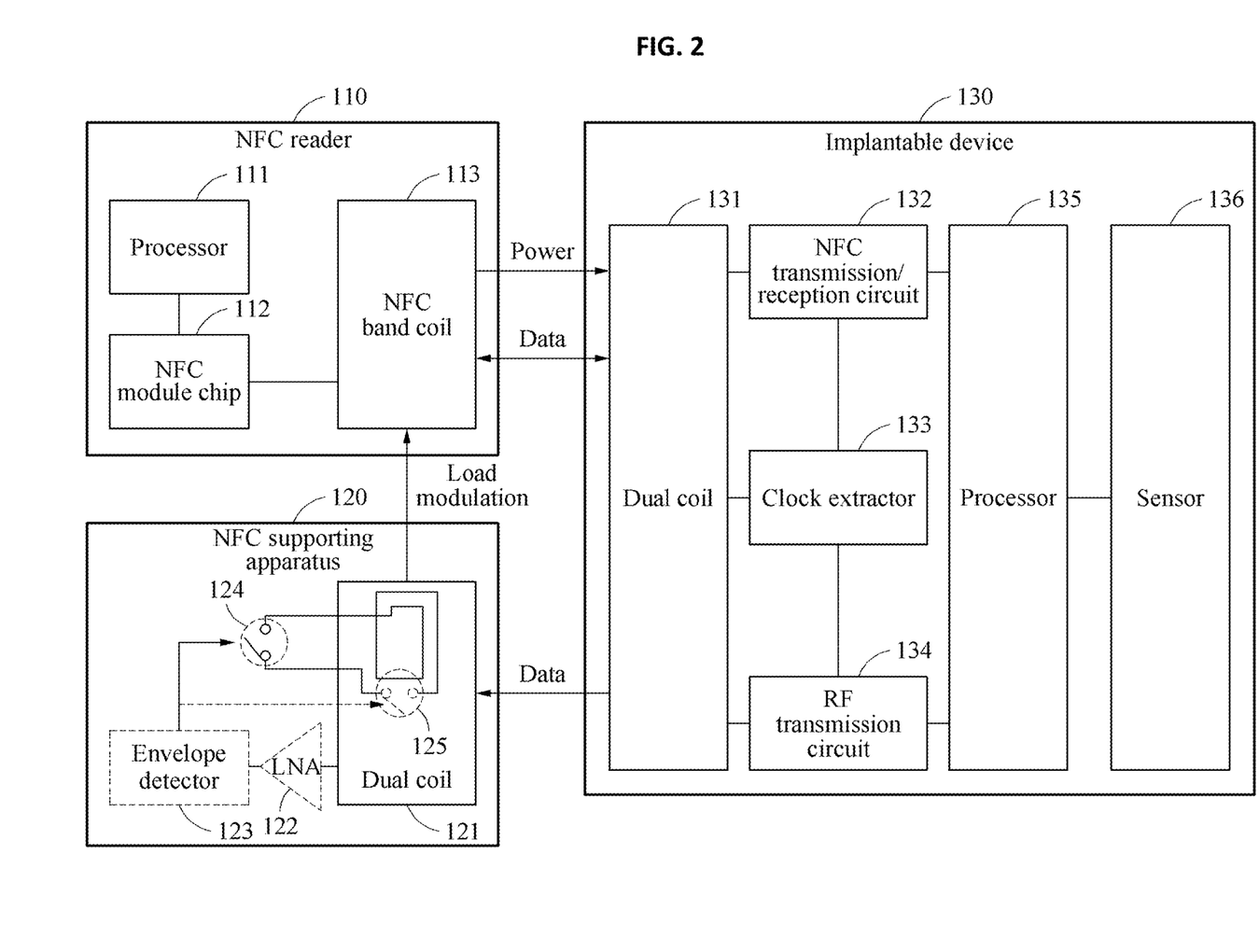
FIG. 2 illustrates an example of a configuration of an NFC system.

The NFC supporting apparatus 120 may be implemented as an external device or an internal device of the NFC reader 110. When implemented in an external device of the NFC reader 110, the NFC supporting apparatus 120 may be implemented as illustrated in FIG. 2. As an external device of the NFC reader 110, the NFC supporting apparatus 120 may be attached or connected to an outer side or surface of the NFC reader 110. For example, the NFC supporting apparatus 120 may be implemented in the form of an accessory of the NFC reader 110. When implemented as an internal device of the NFC reader 110, the NFC supporting apparatus 120 may be in the form of a chip or a module.

Data received from within the NFC reader 110 may be transmitted to the NFC supporting apparatus 120 through light energy or kinetic energy, in addition to may be being transmitted as a radio signal utilizing an electromagnetic field.

FIG. 2 illustrates an example of a configuration of an NFC system.

When the distance between the NFC reader 110 outside of the body of a user and the implantable device 130 implanted in the body of the user is greater than a predetermined distance, or the size of the coil in the implantable device is not large enough to cause adequate load modulation, data transmission from the NFC reader 110 to the implantable device may be possible, but data transmission from the implantable device 130 to the NFC reader 110 may become difficult or erroneous. In this example, the frequency of an RF band having a high body transmittance and enabling long-distance communication, such as a MICS band, may be used instead of the frequency of the NFC band for the data transmission.

For this, the NFC reader 110 may include a processor 111, an NFC module chip 112, and an NFC band coil 113. The implantable device 130 may include a dual coil 131, an NFC transmission/reception circuit 132, a clock extractor 133, an RF transmission circuit 134, a processor 135, and a sensor 136. The NFC supporting apparatus 120 may include a dual coil 121 that concurrently resonates in an NFC band and an RF band, a low-noise amplifier (LNA) 122 to amplify a received data signal, an envelope detector 123 for decoding, a first switch 124, and a second switch 125. The dual coil 131 and the dual coil 121 each include an NFC band coil and an RF band coil. The clock extractor 133 may be an element for changing a signal received from the NFC reader to a clock signal. The RF transmission circuit 134 may be an element for performing a RF communication.

The implantable device 130 may extract a signal of 13.56 MHz from an NFC data request signal received from the NFC reader 110 and transmit a data signal of a MICS band to the NFC supporting apparatus 120 through ASK using the extracted signal. An amplitude modulation signal may be generated at the RF band coil by switching of the RF band coil of the implantable device 130.

The NFC band coil of the NFC supporting apparatus 120 may receive the data signal transmitted from the implantable device. The LNA 122 amplifies the received data signal. The envelope detector 123 extracts a switch signal by determining "0" and "1" from the amplified amplitude modulation signal. The first switch 124 is configured to switch the NFC band coil using the extracted switch signal. The NFC band coil of the NFC supporting apparatus 120 generates an amplitude modulation signal at the NFC band coil of the NFC reader 110 in response to the switching. Here, the switch signal is a signal that operates a switch.

The NFC supporting apparatus 120 further includes a second switch. When an amplitude modulation signal is not generated at the RF band coil, the second switch is in an OFF state. Thus, the NFC band coil is disconnected from a circuit. When an amplitude modulation signal is generated at the RF band coil, the second switch is in an ON state. Thus, the NFC band coil is connected to the circuit.

When the NFC reader 110 and the implantable device 130 adequately communicate, or are determined to adequately communicate, using NFC, the NFC supporting apparatus 120 is configured to leave the second switch in the OFF state, such that the NFC band coil of the NFC supporting apparatus 120 is disconnected from the circuit. In this configuration, the NFC band coil of the NFC supporting apparatus 120 does not affect the NFC band coil of the NFC reader 110. Thus, the NFC band coil of the NFC supporting apparatus 120 is configured not to interfere or disrupt the NFC between the NFC reader 110 and the implantable device 130.

When the NFC reader 110 and the implantable device 130 cannot adequately communicate, or are determined to not adequately communicate, using NFC, the NFC supporting apparatus 120 is configured to toggle the second switch to be in an ON state, such that the NFC band coil of the NFC supporting apparatus 120 is connected to the circuit. The NFC supporting apparatus 120 is configured to relay data transmission between the implantable device 130 and the NFC reader 110. The NFC supporting apparatus 120 is configured to receive an RF band signal from the implantable device 130, and change the impedance of the NFC reader 110 based on the received RF band signal. The NFC reader 110 then receives the data signal through impedance change.

In another example, elements of an NFC supporting apparatus may be integrated into an NFC reader. The NFC reader may include a processor, a first NFC band coil, a dual coil, and a first switch, wherein the dual coil may include a second NFC band coil and an RF band coil. The NFC reader may further include an LNA and an envelope detector. The NFC reader may further include a second switch.

When the NFC reader 110 and the implantable device 130 adequately communicate, or are determined to adequately communicate, using NFC, the NFC supporting apparatus 120 may be configured to leave the second switch in the OFF state, such that the NFC band coil of the NFC supporting apparatus 120 is disconnected from the circuit. When NFC adequately communicates, or is determined to adequately communicate, an amplitude modulation signal may not be generated at the RF band coil. When an amplitude modulation signal is not generated at the RF band coil, the second NFC band coil may be in an OFF state based on the second switch.

The processor may transmit a data request signal to the NFC band coil of the implantable device through the first NFC band coil. When the NFC reader 110 and the implantable device 130 do not adequately communicate, or are determined to not adequately communicate, using NFC, an amplitude modulation signal may be generated at the RF band coil by switching of the RF band coil of the implantable device in response to the data request signal. When an amplitude modulation signal is generated at the RF band coil, the second NFC band coil may be in an ON state by the second switch.

The LNA may amplify the amplitude modulation signal generated at the RF band coil. The envelope detector may extract a switch signal from the amplified amplitude modulation signal. The first switch may switch the second NFC band coil based on the amplitude modulation signal. The first switch may switch the second NFC band coil based on the switch signal. The second NFC band coil may generate an amplitude modulation signal at the first NFC band coil in response to the switching.

Figure 3:
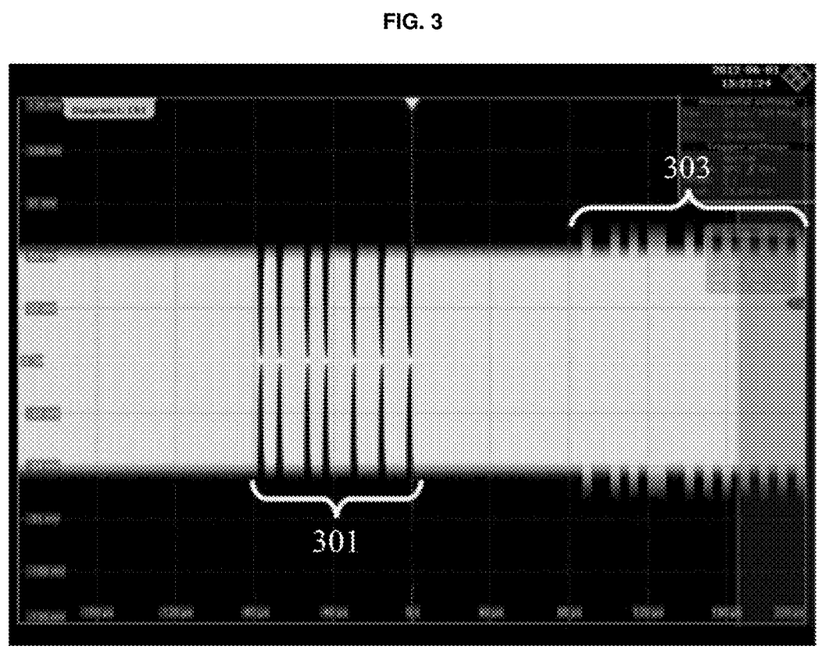
FIG. 3 illustrates an example of an amplitude of a radio frequency (RF) field being changed by communication between an NFC reader and an implantable device.

FIG. 3 illustrates an example of an amplitude of an RF field being changed by communication between an NFC reader and an implantable device.

In examples, NFC is performed between an NFC reader and an NFC tag. In this example, the NFC reader is also referred to as an initiator, and the NFC tag is also referred to as a target. The implantable device 130 corresponds to the NFC tag. The NFC reader transmits a data request signal using ASK while concurrently supplying power to the target through a frequency of 13.56 MHz. Here, the data request signal includes polling commands.

A graph 301 of FIG. 3 illustrates a state in which the polling commands are transmitted to the implantable device 130 through the NFC reader 110. As shown in the graph 301, data included in the polling commands are represented as digital signals of "0" and "1."

The implantable device 130 extracts data by analyzing a pattern of an amplitude change over time. The implantable device 130 causes a change in an amplitude of an RF field by changing an impedance of the NFC reader through switching its own coil.

A graph 303 of FIG. 3 illustrates a change in an amplitude of an electromagnetic field modulated by the implantable device 130. When NFC between the NFC reader 110 and the implantable device 130 is performed normally, the change in the amplitude of the electromagnetic field is detectable. However, in a poor communication environment, which may be due to distance or noise, NFC does not adequately communicate. In this example, the change in the amplitude of the electromagnetic field is undetectable. The change in the amplitude of the electromagnetic field is suppressed and/or a large amount of noise is mixed into the signal.

In an environment in which normal (or adequate) data reception of the NFC reader 110 is compromised when using an amplitude modulation signal of the implantable device 130, the NFC supporting apparatus 120 is configured to transmit an amplitude modulation signal to the NFC reader 110 using another type of data signal.

Figure 4:
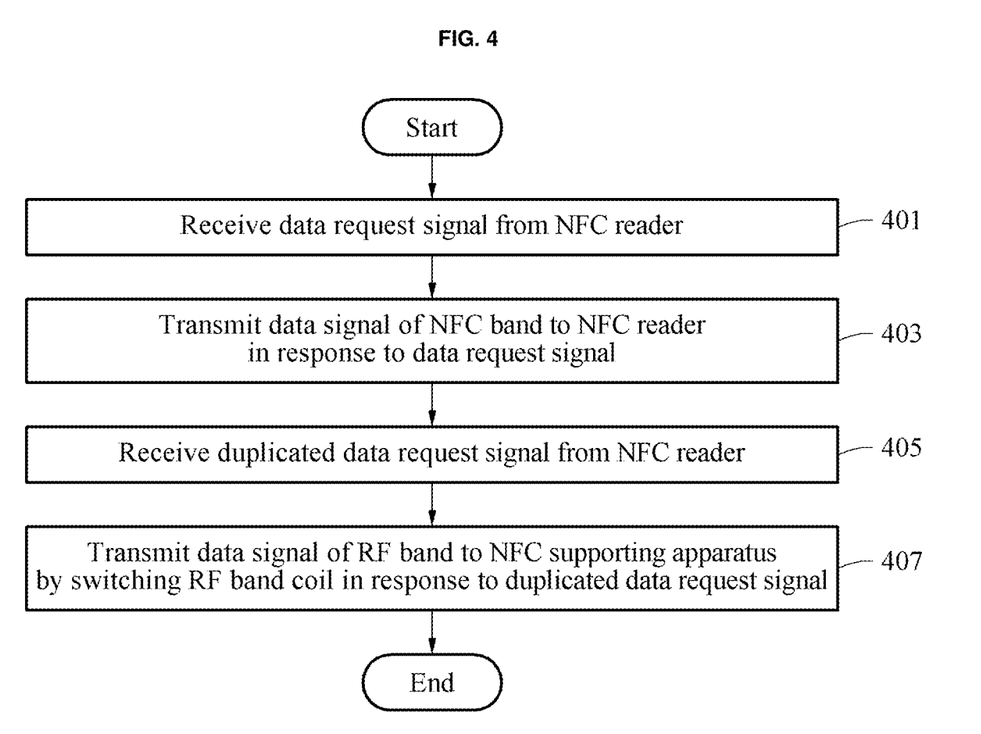
FIG. 4 illustrates an example of an NFC method performed by an implantable device.

FIG. 4 illustrates an example of an NFC method performed by an implantable device.

Referring to FIG. 4, in operation 401, the implantable device 130 receives a data request signal from the NFC reader 110. In operation 403, the implantable device 130 transmits a data signal of an NFC band to the NFC reader 110 in response to the data request signal.

When the data request signal of an NFC band is received by the implantable device 130, the implantable device 130 switches or uses an NFC band coil for communication in a typical NFC method. By the switching or using the NFC band coil, an amplitude modulation occurs at the NFC band coil of the NFC reader 110, and the data signal is transmitted.

Due to communication environment issues, the data signal may not be adequately transmitted to the NFC reader 110. For example, when the distance between the NFC reader 110 and the implantable device 130 is relatively large or when the implantable device 130 is implanted relatively deep inside a living body, it may be difficult or impossible to adequately transmit the data signal to the NFC reader 110.

Thus, in this scenario, the NFC reader 110 re-transmits the data request signal to the implantable device 130.

In operation 405, the implantable device 130 receives a duplicated data request signal from the NFC reader. In operation 407, the implantable device 130 transmits a data signal of an RF band to the NFC supporting apparatus by switching to an RF band coil in response to the duplicated data request signal.

While the switch to an RF band coil occurred after a receiving the duplicated data request signal, the number of received duplicated data request signal is not limited thereto and the switching may occur after a predetermined number of received duplicated data request signals, for example, four.

The NFC supporting apparatus 120 waits to receive an RF band signal, e.g., for a predetermined period or clock cycles. When the RF band signal is received from the implantable device 130, the NFC supporting apparatus 120 switches both ends of the NFC band coil by converting, through decoding, the received data signal into a switch signal for switching of the NFC band coil. The NFC supporting apparatus 120 transmits the data signal to the NFC reader 110 through amplitude modulation.

As described above, when a communication environment is degraded, or determined to be degraded, the implantable device 130 communicates with the NFC reader 110 through the NFC supporting apparatus 120 using a non-NFC transmission method or signaling, e.g., an RF band frequency.

Figure 5:
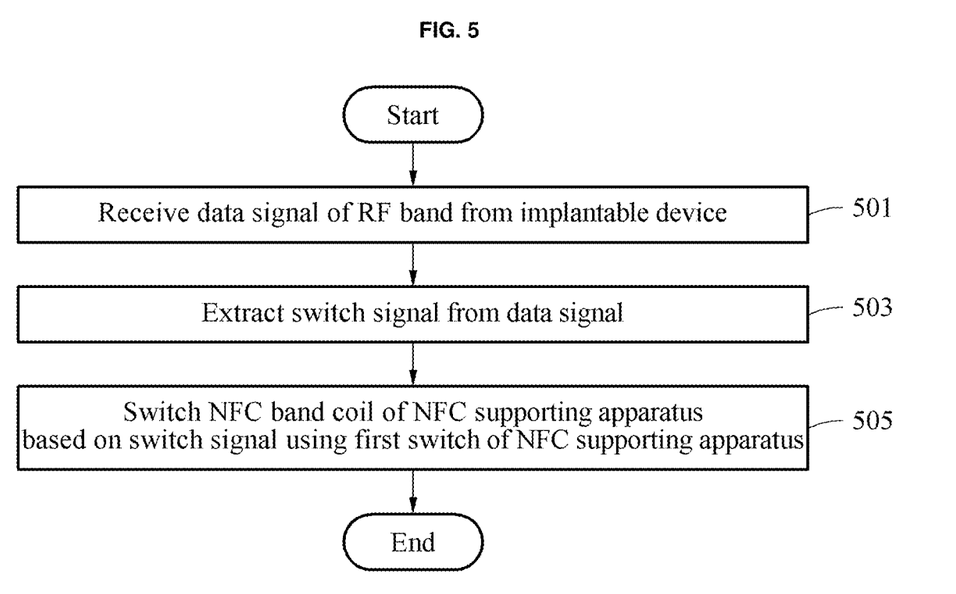
FIG. 5 illustrates an example of an NFC method performed by an NFC supporting apparatus.

FIG. 5 illustrates an example of an NFC method performed by an NFC supporting apparatus.

In operation 501, the NFC supporting apparatus 120 receives a data signal of an RF band from the implantable device. Through communication by amplitude modulation between the implantable device 130 and the NFC supporting apparatus 120, the data signal of the RF band is received by the NFC supporting apparatus 120.

The NFC supporting apparatus 120 is configured to change the NFC band coil of the NFC supporting apparatus to be in an ON state by toggling on the second switch of the NFC supporting apparatus in response to reception of the data signal of the RF band. The NFC band coil of the NFC supporting apparatus 120 is connected to a circuit. Through this, the NFC supporting apparatus 120 relays data transmission between the implantable device 130 and the NFC reader 110.

In operation 503, the NFC supporting apparatus 120 extracts a switch signal from the data signal. The switch signal is a signal to operate the first switch.

In operation 505, the NFC band coil of the NFC supporting apparatus is switched based on the switch signal using the first switch of the NFC supporting apparatus. The NFC band coil generates an amplitude modulation signal at the NFC band coil of the NFC reader in response to the switching.

Figure 6:
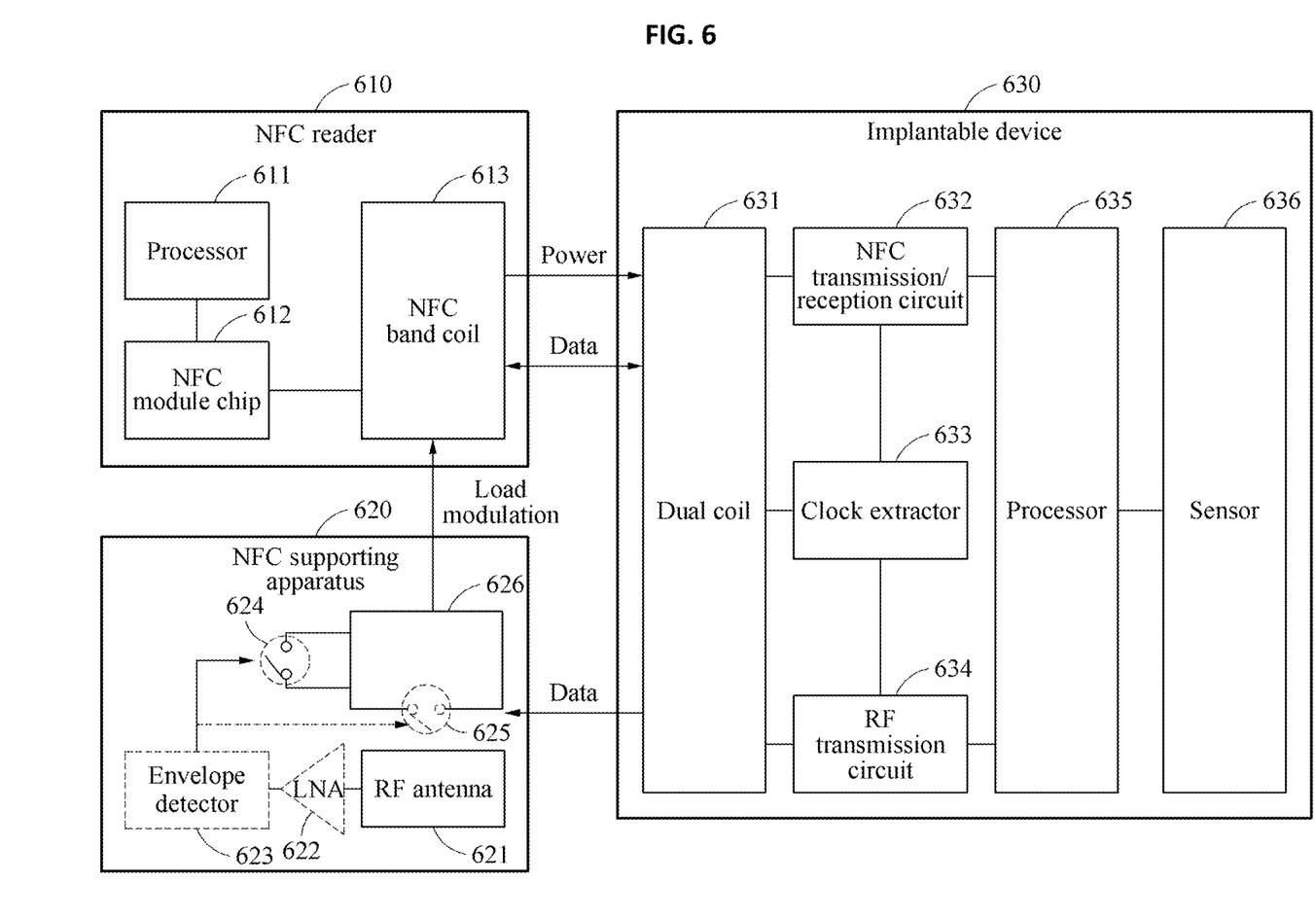
FIG. 6 illustrates an example of a configuration of an NFC system.

FIG. 6 illustrates an example of a configuration of an NFC system.

Referring to FIG. 6, an NFC reader 610 and an implantable device 630 transmit data using an RF band frequency. The implantable device 630 transmits a data signal to an NFC supporting apparatus 620 using a general communication method, instead of communication by amplitude modulation. Herein, the RF band frequency includes, or refers to, various frequency bands, such as, a frequency of a MICS band.

The NFC supporting apparatus 620 receives the data signal using an RF antenna 621. The NFC supporting apparatus 620 alternately uses the RF antenna 621 and a resonator including an NFC band coil 626.

For this, the NFC supporting apparatus 620 includes the NFC band coil 626, the RF antenna 621, and a first switch 624. The NFC supporting apparatus 620 may further include an LNA 622 to amplify the received data signal, an envelope detector 623 for decoding, and the second switch 625. Here, the second switch 625 is used to select a mode in which the RF antenna 621 is used and a general NFC mode.

By switching of the RF band coil, constituting an RF transmission/reception circuit 634 of the implantable device 630, the data signal is transmitted to the RF antenna 621. The first switch 624 switches the NFC band coil 626 based on the data signal. The NFC band coil 626 generates an amplitude modulation signal at an NFC band coil 613 of the NFC reader 610 in response to the switching.

Figure 7:
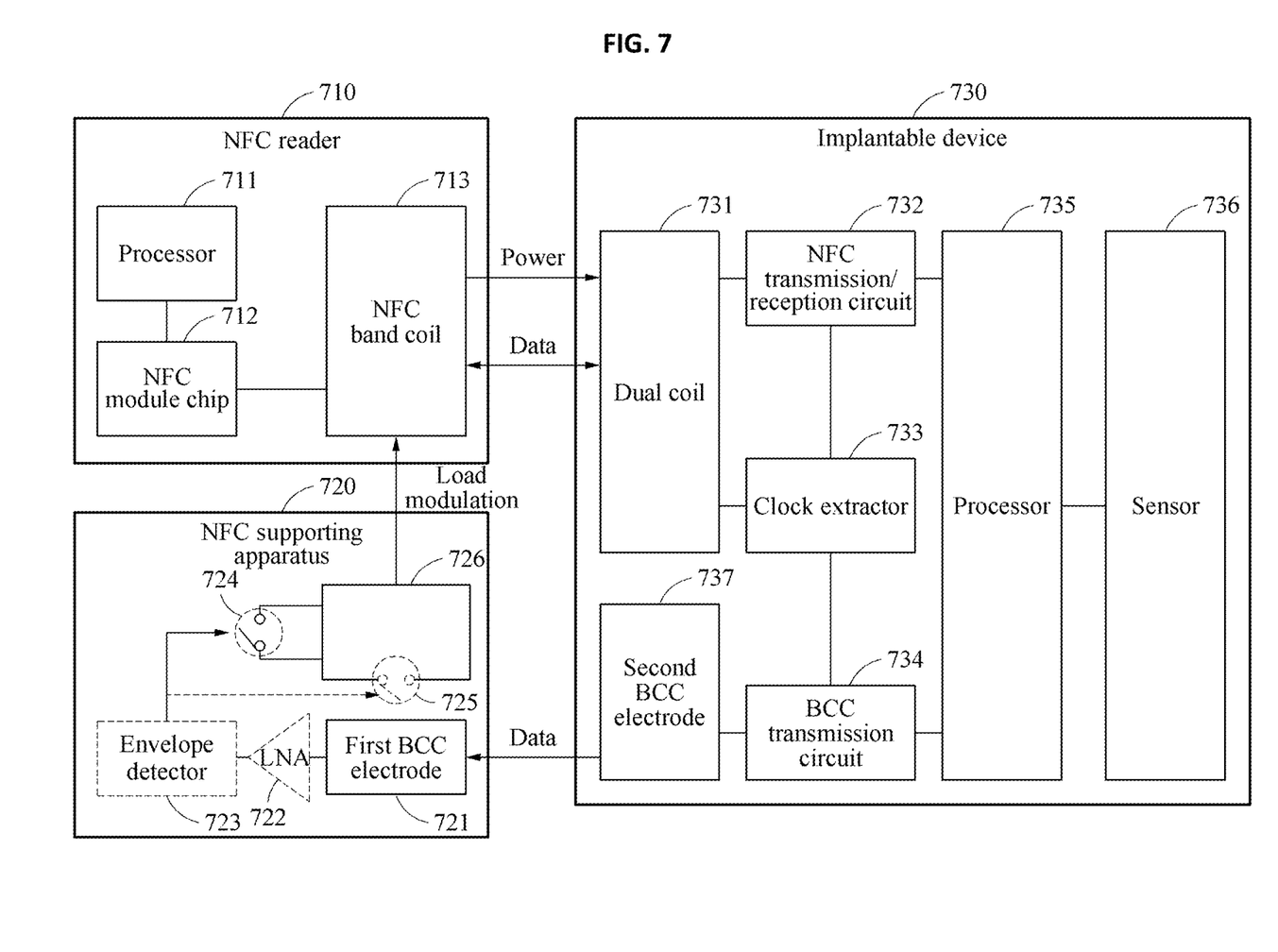
FIG. 7 illustrates an example of a configuration of an NFC system.

FIG. 7 illustrates an example of a configuration of an NFC system.

Referring to FIG. 7, an NFC supporting apparatus 720 receives a data signal from an implantable device 730 using a body channel communication (BCC) electrode and relays data included in the received data signal to an NFC reader 710.

BCC includes capacitive-coupling BCC and galvanic-coupling BCC depending on the scheme used in inducing an electric field in a human body. In BCC, when a differential signal is applied between two electrodes attached to a human body during transmission of a signal in a transmitting end, a minute current is generated between the two electrodes. The generated minute current is propagated through conductive tissues of the human body and detected as a differential signal by electrodes attached in a receiving end of the transmitted signal. Using this principle, a signal is transmitted from one part of the human body to another. In this example, the human body acts as a single special conducting wire.

The NFC supporting apparatus 720 use BCC instead of RF band data communication. In this example, the implantable device 730 includes a BCC transmission circuit 734 and a second BCC electrode 737.

The NFC supporting apparatus 720 includes an NFC band coil 726, a first BCC electrode 721 to receive a BCC signal, and a first switch 724. The NFC supporting apparatus 720 may further include a LNA 722 to amplify the received data signal, an envelope detector 723 for decoding, and a second switch 725. Here, the second switch 725 is used to select a mode in which the first BCC electrode 721 is used and a general NFC mode.

The first BCC electrode 721 receives the data signal from the second BCC electrode 737 of the implantable device. The first switch 724 switches the NFC band coil 726 based on the data signal. The NFC band coil 726 generates an amplitude modulation signal at an NFC band coil 713 of the NFC reader 710 in response to the switching.

Figure 8:
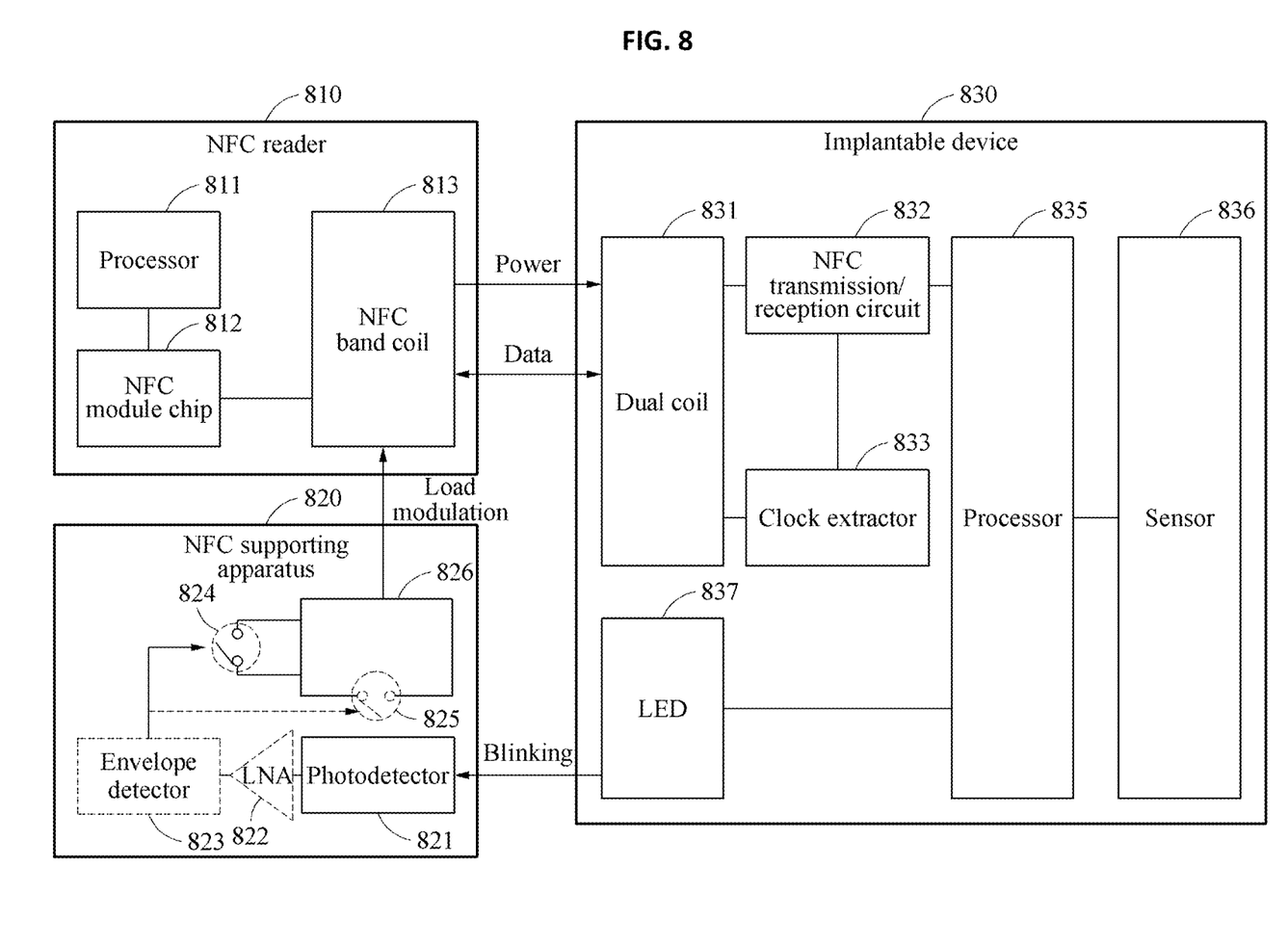
FIG. 8 illustrates an example of a configuration of an NFC system.

FIG. 8 illustrates an example of a configuration of an NFC system.

Referring to FIG. 8, an NFC supporting apparatus 820 relays data transmission between an NFC reader 810 and an implantable device 830 using an optical signal. In this example, the implantable device 830 includes a light emitting diode (LED) 837. The NFC supporting apparatus 820 includes an NFC band coil, a photodetector, and a first switch. The NFC supporting apparatus 820 may further include an LNA 822 to amplify a received data signal, an envelope detector 823 for decoding, and a second switch 825.

A photodetector 821 receives an optical signal from the LED 837 of the implantable device 830. A first switch 824 switches an NFC band coil 826 based on the optical signal. The NFC band coil 826 generates an amplitude modulation signal at an NFC band coil 813 of the NFC reader 810 in response to the switching.

The NFC reader 110, 610 710 and 810, processor 111, 611, 711 and 811, NFC band coil 113, 613, 713 and 813, NFC module chip 112, 612, 712 and 812 NFC supporting apparatuses, NFC supporting apparatuses 120, 620, 720, and 820, dual coil 121, envelope detector 123, 623, 723 and 823, implantable device 130, 630, 730 and 830, dual coil 131, 631, 731 and 831, LNA 122, 622, 722 and 822, NFC transmission/reception circuit 132, 632, 732 and 832, processor 135, 635, 735 and 835, sensor 136, 636, 736 and 836, RF antenna 621, clock extractor 133, 633, 733 and 833, RF transmission circuit 634, first BCC electrode 721, second BCC electrode 737, BCC transmission circuit 734, photodetector 821, LED 837 and other apparatuses, units, modules, devices, and other components described herein with respect to FIGS. 1-8 hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD-Rs, CD-RWs, CD-RWs, DVD-ROMs, DVD-Rs, DVD-Rs, DVD-RWs, DVD-RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A near-field communication (NFC) system, comprising:
    an NFC supporting apparatus, including:
        a dual coil including an NFC band coil and a radio frequency (RF) band coil, wherein an RF amplitude modulation signal is generated at the RF band coil of the NFC supporting apparatus based on a transmission of an implantable device; and
        a first switch configured to switch the NFC band coil based on the RF amplitude modulation signal,
    wherein the NFC band coil is configured to generate an NFC amplitude modulation signal at an NFC band coil of an NFC reader in response to the transmission of the implantable device, and
    wherein whether an RF amplitude modulation signal is received from the implantable device toggles the NFC band coil to an OFF state or an ON state.

2. The NFC system of claim 1, wherein the NFC supporting apparatus further comprises:
    a low-noise amplifier (LNA) and an envelope detector,
    wherein the LNA is configured to amplify the generated NFC amplitude modulation signal,
    the envelope detector is configured to extract a switch signal from the amplified NFC amplitude modulation signal, and
    the first switch is configured to switch the NFC band coil based on the switch signal.

3. The NFC system of claim 1, wherein the NFC supporting apparatus further comprises:
    a second switch,
    wherein the second switch is configured to toggle the NFC band coil to the OFF state when an RF amplitude modulation signal is not received from the implantable device, and
    the second switch is configured to toggle the NFC band coil to the ON state when an RF amplitude modulation signal is received from the implantable device.

4. The NFC system of claim 1, further comprising the implantable device.

5. The NFC system of claim 1, further comprising the NFC reader.

6. A near-field communication (NFC) reader, comprising:
a processor, a first NFC band coil, a dual coil, and a first switch, the dual coil including a second NFC band coil and a radio frequency (RF) band coil,
wherein the processor is configured to transmit a data request signal to an NFC band coil of an implantable device through the first NFC band coil,
an RF amplitude modulation signal is generated at the RF band coil based on a transmission from the implantable device in response to the data request signal,
the first switch is configured to switch to the second NFC band coil based on the RF amplitude modulation signal, and
the second NFC band coil is configured to generate an NFC amplitude modulation signal at the first NFC band coil in response to the transmission from the implantable device, and
wherein whether an RF amplitude modulation signal is received from the implantable device toggles the second NFC band coil to an OFF state or an ON state.

7. The NFC reader of claim 6, further comprising:
a low-noise amplifier (LNA) and an envelope detector,
wherein the LNA is configured to amplify the RF amplitude modulation signal generated at the RF band coil,
the envelope detector is configured to extract a switch signal from the amplified RF amplitude modulation signal, and
the first switch is configured to switch to the second NFC band coil based on the switch signal.

8. The NFC reader of claim 6, further comprising:
a second switch,
wherein the second switch is configured to toggle the second NFC band coil to the OFF state when an RF amplitude modulation signal is not received from the implantable device, and
the second switch is configured to toggle the second NFC band coil to the ON state when an RF amplitude modulation signal is received from the implantable device.

9. A near-field communication (NFC) method, comprising:
receiving a radio frequency (RF) data signal of an RF band from an implantable device;
extracting a switch signal from the data signal; and
switching to an NFC band coil of an NFC supporting apparatus based on the switch signal using a first switch of the NFC supporting apparatus,
wherein the NFC band coil is configured to generate an NFC amplitude modulation signal at an NFC band coil of an NFC reader in response to the switching, and
wherein whether the RF data signal is received from the implantable device toggles the NFC band coil to an OFF state or an ON state.

10. The NFC method of claim 9, further comprising:
changing the NFC band coil of the NFC supporting apparatus to be in the ON state by toggling a second switch of the NFC supporting apparatus, in response to reception of the RF data signal.

11. A near-field communication (NFC) supporting apparatus, comprising:
an NFC band coil, a radio frequency (RF) antenna, and a first switch,
wherein a data signal is transmitted to the RF antenna based on a transmission from an implantable device,
the first switch is configured to switch to the NFC band coil based on the data signal, and
the NFC band coil is configured to generate an NFC amplitude modulation signal at an NFC band coil of an NFC reader in response to the transmission from the implantable device, and
wherein whether the data signal is received from the implantable device toggles the NFC band coil to an OFF state or an ON state.

12. A near-field communication (NFC) supporting apparatus, comprising:
an NFC band coil, a first body-coupled communication (BCC) electrode, and a first switch,
wherein the first BCC electrode is configured to receive a data signal from a second BCC electrode of an implantable device,
the first switch is configured to switch to the NFC band coil based on the data signal, and
the NFC band coil is configured to generate an NFC amplitude modulation signal at an NFC band coil of an NFC reader in response to the first switch, and
wherein whether the data signal is received from the implantable device toggles the NFC band coil to an OFF state or an ON state.

13. A near-field communication (NFC) supporting apparatus, comprising:
an NFC band coil, a photodetector, and a first switch,
wherein the photodetector is configured to receive an optical signal from an implantable device,
the first switch is configured to switch to the NFC band coil based on the optical signal, and
the NFC band coil is configured to generate an NFC amplitude modulation signal at an NFC band coil of an NFC reader in response to the first switch, and
wherein whether the optical signal is received from the implantable device toggles the NFC band coil to an OFF state or an ON state.

* * * * *